J. H. COREY.
Culinary Boilers.
No. 143,673.
Patented Oct. 14, 1873.
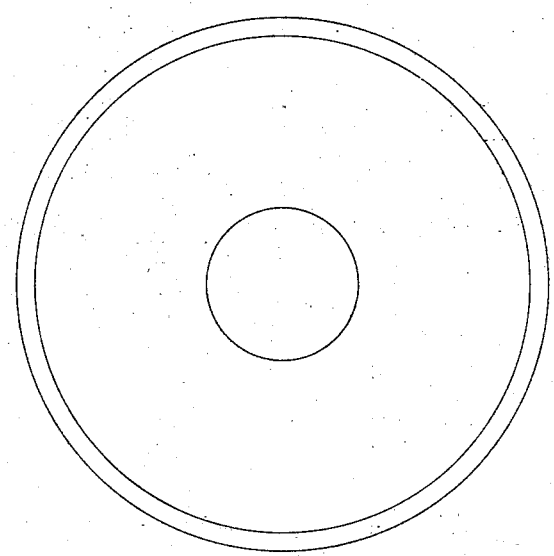
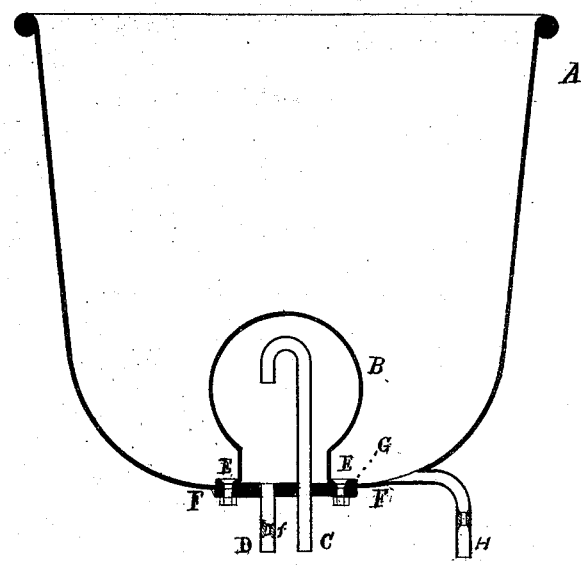

UNITED STATES PATENT OFFICE.

JAMES H. COREY, OF NEW YORK, N. Y.

IMPROVEMENT IN CULINARY BOILERS.

Specification forming part of Letters Patent No. 143,673, dated October 14, 1873; application filed May 29, 1873.

*To all whom it may concern:*

Be it known that I, JAMES H. COREY, of New York city, county, and State, have invented an Improvement in Culinary and Heating Vessels, of which the following is a specification:

The object of my invention is to so construct culinary and heating vessels which are to be heated by steam as to greatly lessen the necessity for repairs, as well as to facilitate the matter of repairing when needed, and also to increase the effect of the steam used in heating the contents of the vessel.

I construct the heating or culinary vessel A of any desired shape and size, and within said vessel I attach the steam-chamber B, as shown in the drawing. I make this chamber spherical in shape, in order to secure the greatest amount of heating-surface possible in proportion to the space occupied by it, and also to secure the impinging against its sides of the water surrounding it as it ascends from the bottom of the vessel A, which it will do as it becomes heated.

The manner of attachment is by means of a flange, G, and screw-bolts E, thus rendering its removal easy without disturbing the vessel A, nothing being necessary but merely unscrewing the bolts E, thus obviating the necessity of moving the vessel A when it becomes necessary to repair the chamber B. Into this steam-chamber is introduced the steam-pipe C, and this pipe I make with a bend or goose-neck at its upper end, as shown in the drawing, for the purpose of directing the jet of steam passing through it downward, and thus distributing the heat more regularly throughout the steam-chamber than would be done by a straight pipe, and also obtaining the greatest heat at the bottom of the vessel A, where the coldest water always is, instead of at the top where the water is warmer, as would be the case with a straight pipe; and a still further advantage is gained by my bent pipe over a straight one in this, that the latter directs the steam in a concentrated jet against a small space of the upper interior of the chamber B, and the result is that the tinning of the chamber is much sooner driven off or impaired at that point by the extreme heat of the concentrated jet of steam than it could be if the steam were more generally diffused throughout the chamber, as will be the case with the downward direction or discharge of the steam by means of the bent pipe. By discharging the steam downward the bottom part of the chamber B gets the greatest quantity of the heat of the steam, and, as that part of it is surrounded with the coldest water in the bottom of the vessel A, the greatest effect is produced in the heating process. I insert a pipe, D, in the bottom of the vessel A and inside the flange of the chamber B, said pipe being furnished with a stop, $f$, so as to regulate the discharge of the water accumulating from condensation inside the chamber B. I also attach a pipe, H, with a stop-cock to the bottom of the vessel A, for the purpose of drawing off the contents of the same.

Having thus described my invention, what I claim, and desire to secure by Letters Patent, is—

The combination of the vessel A, globular chamber B, bent pipe C, and discharge-pipes D and H, all arranged to operate substantially as described.

JAMES H. COREY.

Witnesses:
T. C. THEAKER,
JNO. M. MORSE.